July 8, 1930.  H. D. FLEGEL  1,770,203
SIGNAL DEVICE
Filed Sept. 16, 1929
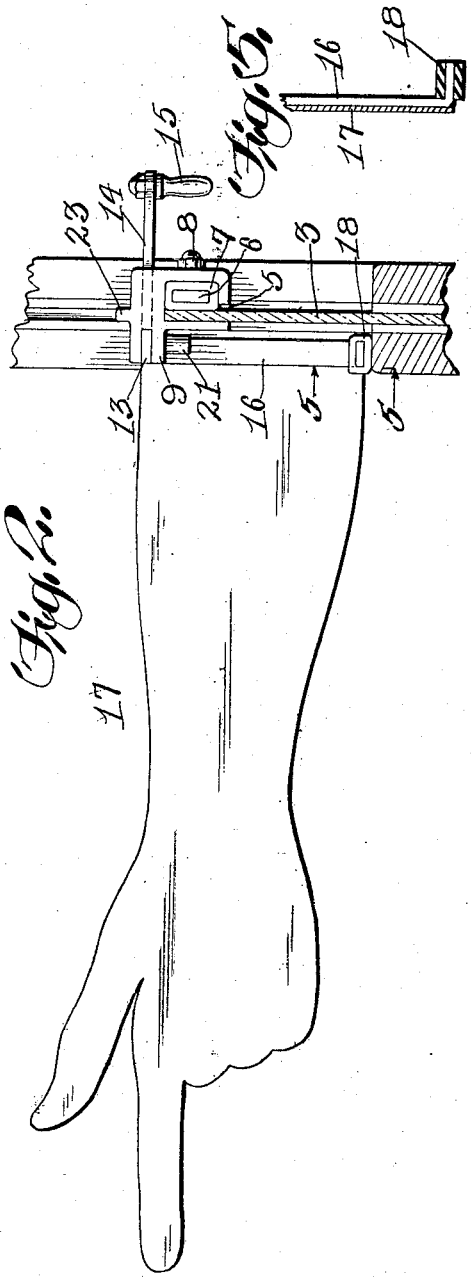
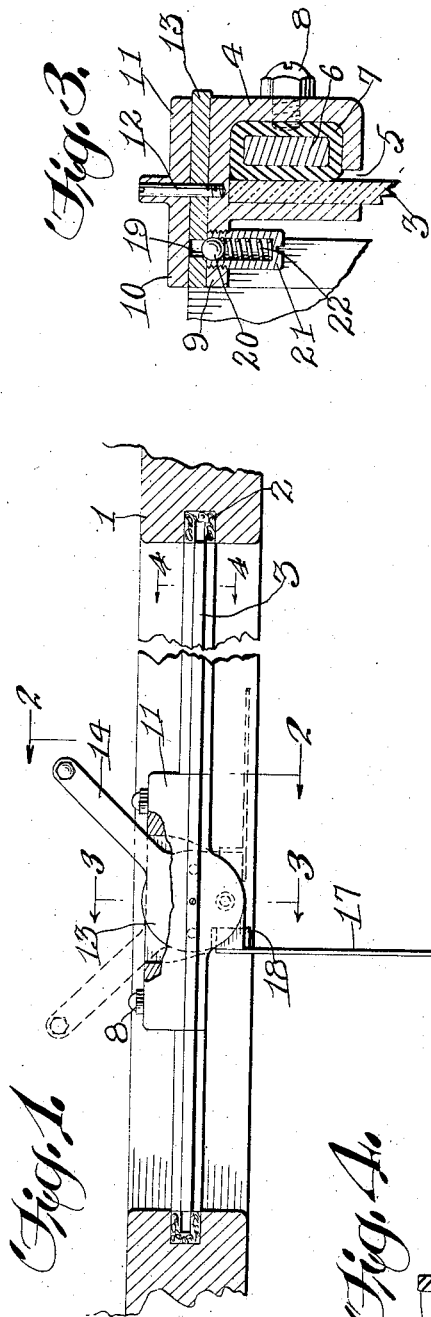
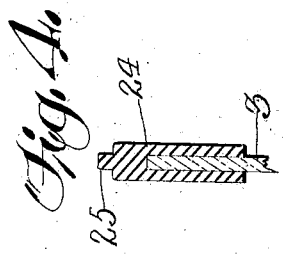
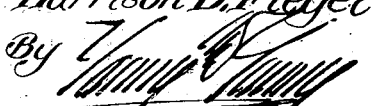
Inventor
Harrison D. Flegel
By
Attorneys Patented July 8, 1930

1,770,203

UNITED STATES PATENT OFFICE

HARRISON D. FLEGEL, OF RACINE, WISCONSIN

SIGNAL DEVICE

Application filed September 16, 1929. Serial No. 392,992.

This invention relates to new and useful improvements in signal devices and is particularly constructed for use on motor vehicles.

One of the objects of my invention is the provision of a signal in the shape of a person's arm and hand, and is so mounted with respect to the vehicle that it can be quickly swung out to a horizontal position at right angles to the vehicle in the rear and can be quickly and readily applied to various types of motor vehicles.

Another object of my invention is the provision of a signal of the above type which can be quickly and readily placed in position in a window adjacent the driver's seat in a motor vehicle and can be securely clamped to the movable glass pane in the window so that the operating handle of the signal is in close proximity to the driver whereby to quickly and easily position the signal arm for use.

A further object of my invention is the provision of a signal device of the above with means for maintaining the signal arm in either an operative or inoperative position and said means permitting the signal arm to be easily swung to an operative or inoperative position.

With the above and other objects in view, the invention consists in the novel features of construction, the combination and arrangement of parts hereinafter more fully set forth, pointed out in the claims and shown in the accompanying drawings wherein:

Figure 1 is a top plan view illustrating the application of my improved signal device;

Figure 2 is a sectional view on the line 2—2 of Figure 1;

Figure 3 is a detail section on the line 3—3 of Figure 1;

Figure 4 is a detail section illustrating the application of a closure plate for the upper end of the window pane when the window is closed;

Figure 5 is a detail section on the line 5—5 of Figure 2.

Referring more particularly to the drawing, 1 indicates a window frame of a motor vehicle having longitudinal channels in which are arranged the U-shaped guides 2 for receiving the edges of a movable glass pane 3. In the ordinary construction of motor vehicles, this pane 3 is movable vertically in the window frame and in order to properly position the signal device so that it can be readily observed from the rear and exterior of the vehicle, I provide a frame or housing 4, one side of which is slotted, as shown at 5, to receive the upper edge of the glass pane 3, as illustrated in Figures 2 and 3. This housing 4 is clamped onto the window pane 3 by positioning within the housing a metal bar 6 which is covered with an elastic casing 7 of rubber or similar material.

It will be noted that the bar 6 is positioned between one side of the wall of the housing 4 and one side of the glass pane 3, while the rubber casing encloses the bar 6 and bears against the glass. This bar and casing is forced against the glass by means of a set screw 8 extending through one wall of the housing 4.

Extending laterally from one side of the housing 4, intermediate its end is an arcuate extension 9 cooperating with a similar extension 10 on the top bearing plate 11 which is mounted upon the housing, as shown in Figure 3.

The cover plate 11 is connected to the housing 4 by means of a pivot screw bolt 12 which extends down through the cover plate 11 and through a rotatable plate 13 disposed between one side of the housing and the cover plate 11. The pin 12 passes through the central portion of plate 13 to form a pivot therefor, whereby plate 13 may be rotated relative to the housing 4 and cover plate 11.

Extending outwardly from the plate 13 is an arm 14 carrying a hand grip 15 whereby the operator of the vehicle may readily grasp the hand grip for rotating plate 13. Suspended from the plate 13 is a supporting arm 16 to which the inner end of the signal arm 17 is attached.

The arm 17 is in the shape of a person's hand with the index finger extending directly out from the hand and the arm portion thereof is attached at its inner end to the supporting arm 16. The lower end of the supporting arm 16 has arranged thereover a flexible casing 18 which serves as a support and bumper when the glass pane 3 is in its lowered position, as shown in Figure 2.

It is essential in using this signal device that when the arm is disposed in an outward position, as shown in Figures 1 and 2, the same may be maintained in this position until the operator returns it to an inoperative position parallel with the window, as indicated by the dotted lines in Figure 1. In order to maintain the plate 13 against accidental movement, the outer portion thereof is provided with spaced openings 19 adapted to receive a spring-pressed ball 20 carried by the extension 9 of the housing 4.

The extension 9 is formed with a threaded opening and removably positioned in this opening is the upper threaded end of a socket 21, the socket 21 having a coil spring 22 therein which normally urges the ball 20 upwardly against the lower surface of plate 13 so that when this plate is moved either to an operative or inoperative position, the ball 20 will position itself within one of the openings 19 for retaining the plate 13 against accidental movement.

In Figure 1, I have illustrated by dotted lines, the normal inoperative position of arms 14 and 17, but should the operator desire to extend the signal arm, he grasps the hand grip 15 and moves the arm 14 from the dotted line position to the full line position, thus moving the arm 17 from its dotted line position to the full line position. The operator can quickly and easily swing the arm 17 to either an operative or inoperative position and may remove their hand from the grip 15 during the time the arm 17 is extended, as ball 20 within either opening 19 will maintain the arm in proper position.

When the glass pane 3 is in a closed position, it will be noted that the longitudinal rib 23 on the upper surface of cover 11 will position itself within the transverse groove at the upper end of the frame, but due to the relative thickness of the body 4, the cover plate 11 and plate 13, the glass pane will not reach the upper portion of the frame and in order to entirely close the window at each end of the housing 4, I provide rubber or flexible bifurcated fittings 24 which engage over the upper edge of the window pane 3 and are provided with ribs 25 to cooperate with rib 23 in order to entirely close the window.

It will be apparent from the foregoing that I have provided a comparatively simple and inexpensive signal device which can be readily fitted into position in a motor vehicle window with the body portion of the device fitted upon the upper edge of the glass pane in the window and the device is so constructed that it may be readily actuated by the driver of the vehicle for signalling the following vehicles as to his intention. The construction and arrangement of the parts of the device is such that they can be manufactured and placed on the market at a very low cost.

While I have shown and described the preferred embodiment of my invention, it will be apparent that slight changes may be made in the construction when putting the invention into practice without departing from the spirit of the same or the scope of the appended claims.

I claim:

1. In a device of the class described, a housing having a slot through one wall thereof to receive a supporting element, a bar within the housing, a yieldable covering for the bar and a set screw movable through the housing and engaging the bar for moving the same toward the supporting element, a movable element carried by the housing, a signal member carried by the movable element, means whereby to manually impart movement to the movable element, and yieldable means carried by the housing and cooperating with the movable element for retaining the same in various adjusted positions with respect to the housing.

2. A device of the class described including a housing having a slot through one wall thereof, an arcuate extension at one side of the housing having a threaded opening, a rotatable plate mounted upon the housing and extension, a bearing plate arranged over the rotatable plate, a pivot screw bolt carried by the bearing plate and into the housing, a signal arm movable with the bearing plate, a handle member carried by the plate opposite the signal arm for imparting movement to said plate, a socket member threaded into the opening in the arcuate extension, and a spring-pressed ball carried by said socket member, and said rotatable plate having spaced openings therein into which said ball is projected for retaining the rotatable plate in various adjusted positions.

In testimony that I claim the foregoing I have hereunto set my hand at Racine, in the county of Racine and State of Wisconsin.

HARRISON D. FLEGEL.